(12) United States Patent
Mielenz

(10) Patent No.: US 11,506,506 B2
(45) Date of Patent: Nov. 22, 2022

(54) TRAJECTORY PLANNING FOR A COMMERCIAL VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 16/937,009

(22) Filed: Jul. 23, 2020

(65) Prior Publication Data

US 2021/0033412 A1 Feb. 4, 2021

(30) Foreign Application Priority Data

Aug. 1, 2019 (DE) .......................... 102019211599.3

(51) Int. Cl.
| | | |
|---|---|---|
| *G01C 21/34* | (2006.01) | |
| *G08G 1/01* | (2006.01) | |
| *G01C 21/36* | (2006.01) | |
| *G05D 1/02* | (2020.01) | |
| *G05D 1/00* | (2006.01) | |
| *G06V 20/56* | (2022.01) | |

(52) U.S. Cl.
CPC ..... *G01C 21/3461* (2013.01); *G01C 21/3407* (2013.01); *G01C 21/3691* (2013.01); *G05D 1/0011* (2013.01); *G05D 1/0212* (2013.01); *G08G 1/012* (2013.01); *G08G 1/0112* (2013.01); *G08G 1/0145* (2013.01); *G06V 20/56* (2022.01)

(58) Field of Classification Search
CPC ............ G01C 21/3461; G01C 21/3407; G01C 21/3691; G05D 1/0011; G05D 1/0212; G08G 1/0112; G08G 1/012; G08G 1/0145
See application file for complete search history.

(56) References Cited

U.S. PATENT DOCUMENTS

| | | | | |
|---|---|---|---|---|
| 6,049,753 | A | * 4/2000 | Nimura .............. | G01C 21/3484 701/428 |
| 6,289,278 | B1 | * 9/2001 | Endo .................... | G01C 21/367 701/461 |
| 7,860,639 | B2 | * 12/2010 | Yang ...................... | G08G 1/081 701/1 |
| 9,534,910 | B2 | * 1/2017 | Okumura ............... | G08G 1/166 |
| 9,881,500 | B2 | * 1/2018 | Satomura .......... | G08G 1/096783 |
| 9,964,414 | B2 | * 5/2018 | Slavin ................ | G01C 21/3658 |
| 10,683,016 | B2 | * 6/2020 | Visintainer ............ | G01C 21/30 |

(Continued)

FOREIGN PATENT DOCUMENTS

DE 102019001956 A1 2/2020

*Primary Examiner* — Luis A Martinez Borrero
(74) *Attorney, Agent, or Firm* — Norton Rose Fulbright US LLP; Gerard Messina

(57) ABSTRACT

A method for trajectory planning for a commercial vehicle at a traffic junction, in particular including a traffic circle, by a control unit is provided. Trafficability of a lane of the commercial vehicle within a lane width of the traffic junction is checked prior to traveling into the traffic junction, traveling through a center of the traffic junction via an alternative trajectory is checked when normal negotiating of the traffic junction is not possible, and detection and/or prediction of surrounding traffic and trajectory planning of the alternative trajectory are carried out, taking the detected and/or predicted surrounding traffic into account. Moreover, a control unit, a computer program, and a machine-readable memory medium are provided.

9 Claims, 2 Drawing Sheets

(56) References Cited

U.S. PATENT DOCUMENTS

| | | | |
|---|---|---|---|
| 2004/0049335 A1* | 3/2004 | Schmidt | G01C 21/3461 340/995.23 |
| 2009/0109061 A1* | 4/2009 | McNew | G08G 1/164 340/928 |
| 2010/0082248 A1* | 4/2010 | Dorum | G06F 16/29 701/533 |
| 2010/0228467 A1* | 9/2010 | Wolfe | H05K 999/99 701/119 |
| 2014/0278052 A1* | 9/2014 | Slavin | G01C 21/3492 701/400 |
| 2016/0086285 A1* | 3/2016 | Jordan Peters | G08G 1/096827 701/484 |
| 2016/0091897 A1* | 3/2016 | Nilsson | B60W 40/04 701/25 |
| 2016/0171521 A1* | 6/2016 | Ramirez | B60K 35/00 701/409 |
| 2017/0010113 A1* | 1/2017 | van der Laan | G01C 21/32 |
| 2017/0031364 A1* | 2/2017 | Takahashi | G01C 21/3461 |
| 2017/0103653 A1* | 4/2017 | Satomura | G08G 1/04 |
| 2017/0356746 A1* | 12/2017 | Iagnemma | G01C 21/3461 |
| 2017/0356747 A1* | 12/2017 | Iagnemma | G05D 1/0088 |
| 2017/0356750 A1* | 12/2017 | Iagnemma | G07C 5/0808 |
| 2017/0356751 A1* | 12/2017 | Iagnemma | G05D 1/0214 |
| 2018/0111611 A1* | 4/2018 | MacNeille | G08G 1/22 |
| 2018/0144629 A1* | 5/2018 | Mielenz | G08G 1/0116 |
| 2018/0189578 A1* | 7/2018 | Yang | G01C 21/32 |
| 2018/0238697 A1* | 8/2018 | Maru | G01C 21/3461 |
| 2018/0239358 A1* | 8/2018 | Choi | G05D 1/0212 |
| 2019/0001993 A1* | 1/2019 | Visintainer | G01C 21/30 |
| 2019/0088148 A1* | 3/2019 | Jacobus | G08G 1/096716 |
| 2020/0290614 A1* | 9/2020 | Mielenz | B60W 30/09 |
| 2020/0310450 A1* | 10/2020 | Reschka | B60W 60/0011 |
| 2020/0406912 A1* | 12/2020 | Stein | B60W 30/18109 |
| 2021/0082296 A1* | 3/2021 | Jacobus | H04W 4/026 |
| 2021/0082297 A1* | 3/2021 | Jacobus | H04W 4/02 |
| 2021/0104165 A1* | 4/2021 | Jacobus | H04W 4/02 |
| 2021/0110726 A1* | 4/2021 | Jacobus | G05D 1/0257 |
| 2021/0122375 A1* | 4/2021 | Takamatsu | B60W 50/14 |
| 2021/0248915 A1* | 8/2021 | Jacobus | B60W 10/04 |
| 2021/0276579 A1* | 9/2021 | Mielenz | G01S 7/4972 |
| 2022/0165159 A1* | 5/2022 | Cho | G08G 1/163 |

* cited by examiner

TRAJECTORY PLANNING FOR A COMMERCIAL VEHICLE

CROSS REFERENCE

The present application claims the benefit under 35 U.S.C. § 119 of German Patent Application No. DE 102019211599.3 filed on Aug. 1, 2019, which is expressly incorporated herein by reference in its entirety.

FIELD

The present invention relates to a method for trajectory planning for a commercial vehicle at a traffic junction, in particular a traffic circle, and a control unit, a computer program, and a machine-readable memory medium.

BACKGROUND INFORMATION

Automatedly operable commercial vehicles offer numerous possible uses, and may increase safety when transporting goods. To optimize traffic flow in urban areas, for example, in many cities traffic circles are increasingly being configured as traffic junctions. To save on space requirements of the traffic circle, they often include no traffic islands or structures in their center. As a result, commercial vehicles that cannot negotiate or travel around the traffic circle normally due to their vehicle dimensions or their loading condition may travel directly through the center of the traffic circle.

However, it is problematic that the programming of the automatedly operated commercial vehicles does not allow crossing over lane markings of the traffic circle. For this reason, the automatedly operated commercial vehicle, regardless of its vehicle dimensions and the loading condition, will attempt to negotiate the traffic circle normally, and thus to avoid the center. In particular, the computation of a trajectory takes place independently of the vehicle properties, or of an assessment of the option to travel through the traffic circle on a direct path through its center.

This may result in blocking of the traffic circle by the automatedly operated commercial vehicle, or endangerment of other road users such as cyclists due to swinging out of the commercial vehicle or its load.

SUMMARY

An object of the present invention is to provide a method for taking into account the direct trafficability of a center of a traffic circle.

This object may be achieved by example embodiments of the present invention. Advantageous embodiments of the present invention described herein.

According to one aspect of the present invention, a method for trajectory planning for a commercial vehicle at a traffic junction, in particular at a traffic circle, by a control unit is provided. In one step, trafficability of a lane of the commercial vehicle within a lane width of the traffic junction is checked prior to traveling into the traffic junction. In particular, the trafficability of the traffic junction via a normal trajectory, in which the commonly provided traffic routes and streets are utilized for traveling, may be checked. A vertical clearance, lane width, curve radii, adjacent buildings, streetlights, roadway boundaries, and the like may be ascertained and taken into account in assessing the trafficability.

In a further step, traveling through a center of the traffic junction via an alternative trajectory is checked when normal negotiating, i.e., negotiating via a normal trajectory, of the traffic junction is not possible. It may thus be checked whether the commercial vehicle may partially or completely leave the lane within the traffic junction, and whether "cutting" curves or crossing over the traffic junction in a straight line is possible.

Detection and/or prediction of surrounding traffic and trajectory planning of the alternative trajectory is subsequently carried out, taking the detected and/or predicted surrounding traffic into account. Endangerment of nearby road users by the commercial vehicle may thus be avoided.

According to another aspect of the present invention, a control unit is provided, the control unit being configured for carrying out the method. The control unit may be a vehicle-internal control unit. The control unit may be designed as a separate component, or integrated into an existing control unit or a control system. In particular, the control unit may be designed and controlled based on software and/or hardware. Alternatively or additionally, the control unit may be designed as a vehicle-external server unit. This type of server unit may be based on a cloud technology.

Furthermore, according to one aspect of the present invention a computer program is provided that includes commands, which during execution of the computer program by a computer or a control unit prompt these to carry out the method according to the present invention. According to another aspect of the present invention, a machine-readable memory medium is provided on which the computer program according to the present invention is stored.

The commercial vehicle may be assisted, operated in a semiautomated, highly automated, and/or fully automated, i.e., driverless, manner, according to the German Federal Highway Research Institute standard. In particular, the commercial vehicle may be designed as a truck, bus, van, vehicle combination, semitrailer, and the like. In particular, the commercial vehicle may also be a passenger vehicle or a vehicle having oversized dimensions.

By use of the example method, traffic junctions may be analyzed as to whether they may be traveled through within the designated lane, or whether crossing over a requirement zone, for example a center of a traffic circle, is advantageous. For this purpose, when a situation is present that does not allow properly driving out of the traffic junction, it is checked whether the center of the traffic circle is negotiable. It may thus be checked whether the traffic junction is negotiable along a normal trajectory that leads along the usual traffic routes, or is negotiable along an alternative trajectory. The alternative trajectory may preferably extend, at least in areas, outside the usual roadway sections, and may facilitate the maneuvering of the commercial vehicle and reduce endangerment by the commercial vehicle.

The assessment of the normal and/or alternative trafficability of the traffic junction may take place, for example, taking into account vehicle-side or infrastructure-side surroundings sensors which also check the absence of other road users. As a result, enabling a start of travel into the traffic junction may be triggered, and the derived trajectory may be generated in the form of control commands. The control commands may be subsequently implemented by a vehicle control system, and an automated driving mode of the commercial vehicle may be maintained.

By use of the example method according to the present invention, blocking situations for commercial vehicles as well as traffic jam situations may be avoided. In addition, the availability and the flexibility of commercial vehicles are increased.

According to one exemplary embodiment of the present invention, vehicle parameters of the commercial vehicle are compared to data of a digital map in order to assess the trafficability of the traffic junction. As a result, information of a digital map, such as the curve radius of the lane of the commercial vehicle or vertical clearance, may be compared to vehicle parameters. Examples of vehicle parameters include vehicle dimensions, turning circle, payload, changes in the vehicle dimensions during a turn-off maneuver, and the like.

According to a further exemplary embodiment of the present invention, measured data of the surroundings of the commercial vehicle are received and used for assessing the trafficability of the traffic junction. The measured data may preferably be received and evaluated by the control unit from a vehicle-side and/or vehicle-external sensor system or surroundings sensor system. The lane in which the commercial vehicle is traveling may be ascertained based on the received measured data. In addition, the particular lane markings and roadway boundaries may be detected, and the corresponding curve radii and the available driving surface may be determined by evaluating the measured data. The available driving surface here may also be outside the roadway, and may be limited, for example, by buildings and structures such as streetlights. A check may subsequently be made as to whether this surface is sufficient for the commercial vehicle to travel on the roadway. For example, a surface required by the commercial vehicle, which corresponds to traveling in a traffic circle with a minimum of utilized surface, may be compared to the detected geometries. The traffic situation prior to the traffic junction may be detected, and the trafficability of the traffic junction may be checked.

The vehicle-side or vehicle-external surroundings sensor system may include, for example, camera sensors, LIDAR sensors, radar sensors, ultrasonic sensors, and the like.

According to a further specific embodiment of the present invention, the center of the traffic junction is classified based on the trafficability. By use of this measure, it may be checked whether the center of the traffic junction may be negotiated or traveled through. The center of the traffic junction may be, for example, a center of a traffic circle, a traffic island at an intersection or a T intersection, a speed bump, a roadway narrowing, and the like.

The upcoming center of the traffic junction may be classified according to its passability and trafficability by evaluating the measured data of the surroundings sensor system. It is thus ruled out, for example, that the center is not planted with flowers or configured with stones or obstacles. In particular, it may be checked whether the area in the center represents a flat surface without potholes, and whether this surface is made of a negotiable material such as tar, asphalt, or cobblestones. This may be registered, for example, with the aid of received information from a digital map, or at the traffic junction by evaluating measured data of a camera sensor. If the area of the center includes a flat surface made of a negotiable material, the center is classified as negotiable. This information could also be taken from a map, but may be checked by evaluating the measured data prior to driving through the center.

According to a further specific embodiment of the present invention, elevations, depressions, and/or roadway sections in the center of the traffic junction are detected. The trafficability may thus be classified in a finer gradation. In particular, trafficability of the center in portions or in areas may be registered and taken into account in computing the alternative trajectory. For example, the center may be negotiable in the middle, or may include negotiable sections that are introduced at the side with vegetation.

According to a further specific embodiment of the present invention, information concerning the traffic junction is received via a communication link. In this way, information from a database or from a digital map may be received and used for the trajectory planning. The communication link may be based, for example, on a WLAN, UMTS, GSM, 4G, 5G transmission standard and the like.

According to a further embodiment of the present invention, a teleoperator is contacted and/or a remote control system is activated if the traffic junction is not negotiable. The teleoperator may thus identify a negotiable area or a general trafficability of a center. In addition, temporary remote control of the commercial vehicle may be carried out by the teleoperator.

According to a further exemplary embodiment of the present invention, a trajectory for a turning maneuver is ascertained and control commands for negotiating the ascertained trajectory are generated if the traffic junction is not negotiable. In this way, the automatedly operated commercial vehicle may be removed from the non-negotiable traffic junction, so that the traffic junction is bypassed.

According to a further specific embodiment of the present invention, non-negotiable traffic junctions are ascertained and avoided during route planning for the commercial vehicle. By use of this measure, the approach to non-negotiable traffic junctions and the subsequent turning may be prevented, so that traffic jam situations and traffic obstructions due to turning maneuvers are avoided.

Preferred exemplary embodiments of the present invention are explained in greater detail below with reference to greatly simplified schematic illustrations.

DETAILED DESCRIPTION OF EXAMPLE EMBODIMENTS

Figure 1:
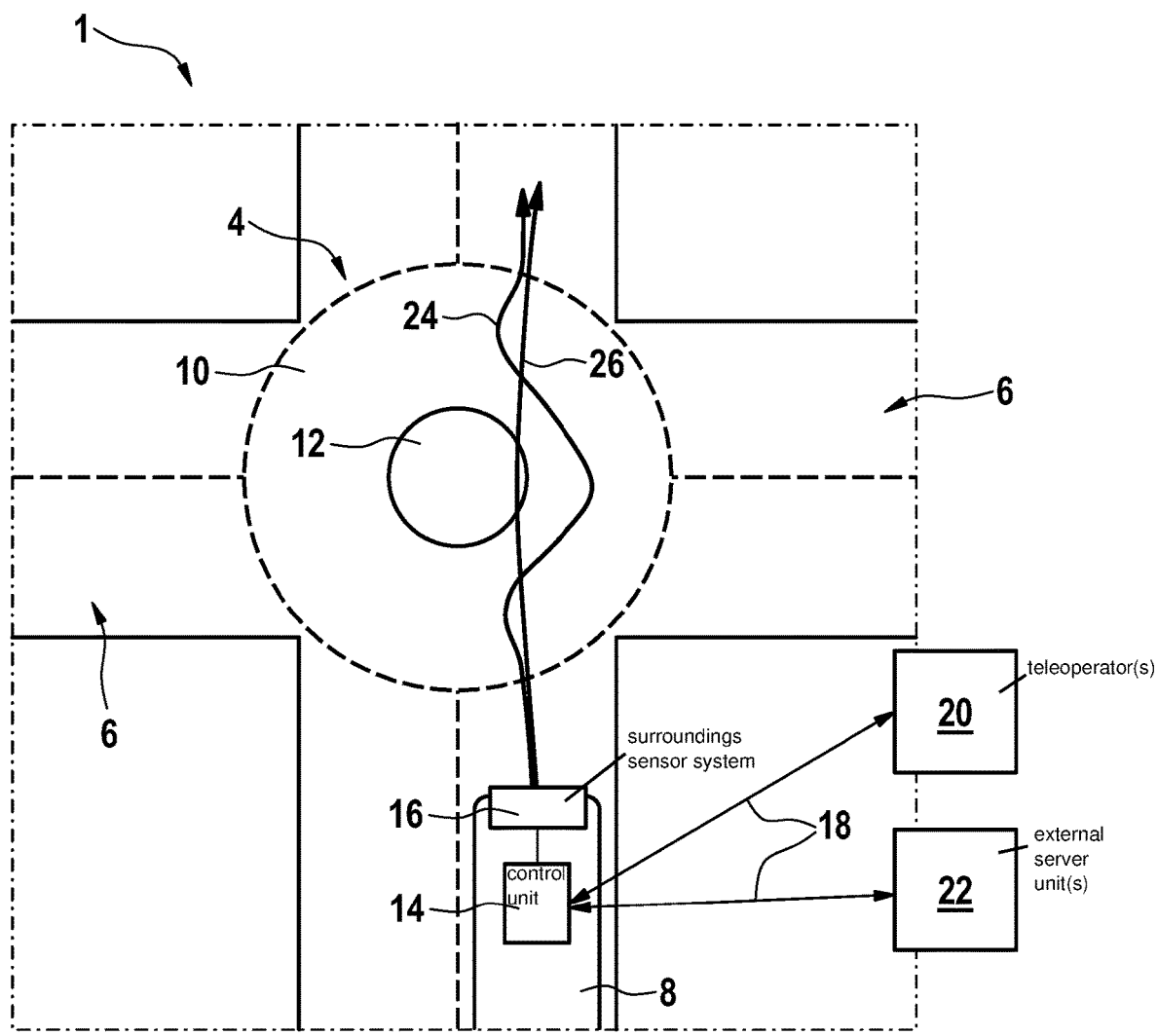
FIG. 1 shows a schematic illustration of a traffic junction for explaining an example method according to the present invention.

FIG. 1 shows a schematic illustration of a traffic junction 1 for explaining a method 2 according to the present invention. Traffic junction 1 is designed as a traffic circle 4 by way of example and includes four access roads 6.

In urban or suburban traffic areas, the traffic flow of such traffic junctions 1 is controlled via a traffic circle 4. Traffic circles 4 are often used that have designs that do not allow commercial vehicles 8 to utilize intended roadway 10 in traffic circle 4, since due to their dimensions, commercial vehicles 8 require a larger turning circle and a greater roadway surface clearance than would be achievable by the present design. In such situations, the particular commercial vehicles 8 must decide whether they may instead travel through traffic circle 4 in center 12, or must carry out further route modifications and maneuvers.

Traffic junction 1 may alternatively or additionally include multiple centers 12 that may divide and/or delimit roadway 10. Centers 12 may in particular be traffic islands, centers of traffic circles, speed bumps, medians, triangular islands, and the like.

Commercial vehicle 8 may be assisted, operated in a semiautomated, highly automated, and/or fully automated, i.e., driverless, manner, according to the German Federal Highway Research Institute standard. In particular, commercial vehicle 8 may be designed as a truck, bus, van, vehicle combination, semitrailer, and the like. In particular, the commercial vehicle may also be a passenger vehicle or a vehicle having oversized dimensions. In the illustrated exemplary embodiment, commercial vehicle 8 is designed as a bus that is planning to negotiate traffic circle 4.

Commercial vehicle 8 includes a control unit 14 and a surroundings sensor system 16. Control unit 14 may be designed as part of a vehicle control system for carrying out automated driving functions, or as an independent component.

Surroundings sensor system 16 includes, for example, camera sensors, LIDAR sensors, radar sensors and the like. The measured data ascertained by surroundings sensor system 16 may be received and evaluated by control unit 14.

In addition, control unit 14 includes an integrated communication unit via which control unit 14 may establish and maintain wirelessly data-transmitting communication links 18 to external units. Such external units may be, for example, external operators or teleoperators 20 and external server units 22.

Commercial vehicle 8 may be remote-controlled or assisted if necessary by the link to a teleoperator 20. An exchange of data and information is possible via communication link 18 to external server unit 22, which may also be implemented as a cloud technology.

Control unit 14 may check whether traffic junction 1 is negotiable via a normal trajectory 24 or via an alternative trajectory 26.

Figure 2:
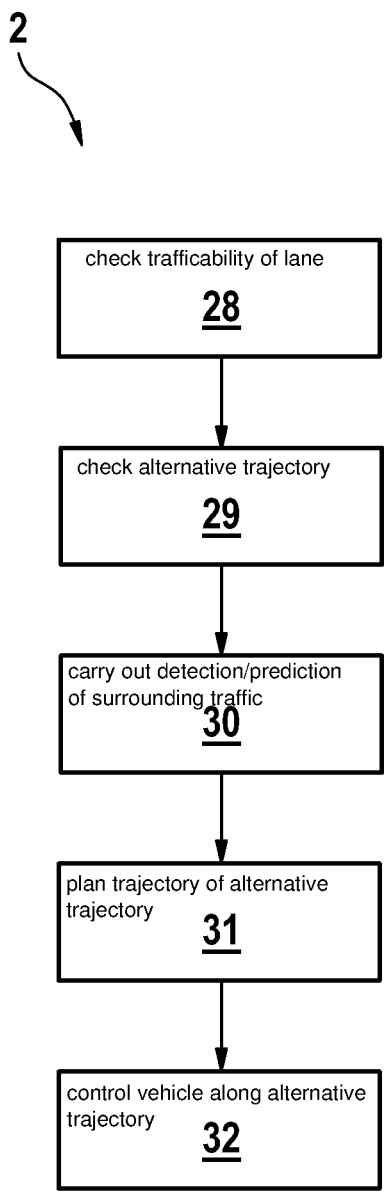
FIG. 2 shows a schematic diagram for explaining the example method according to one exemplary embodiment of the present invention.

FIG. 2 illustrates a schematic diagram for explaining method 2 according to one exemplary embodiment of the present invention. Method 2 according to the present invention allows an automatedly operated vehicle 8, in particular a commercial vehicle, to assess an upcoming traffic junction 1, for example in the form of a traffic circle 4, as to whether it is possible to travel through while complying with traffic regulations. A distinction may be made between the two variants "normal travel through traffic junction 1" and "alternative negotiating of traffic junction 1." Method 2 may preferably be carried out by control unit 14, which according to the exemplary embodiment is situated on the vehicle side.

Trafficability of a lane 10 of commercial vehicle 8 within a lane width of traffic junction 1 prior to traveling into traffic junction 1 is checked in a first step 28. It may be ascertained whether commercial vehicle 8 may travel through the upcoming traffic junction within lane 10, and thus, based on a normal trajectory 24. Normal trajectory 24 corresponds to a trajectory that is utilized by usual vehicles and road users.

For estimating the trafficability, information of a digital map, for example from external server unit 22, may be received and evaluated. Such information may include the curve radius, lane width, and the like. These parameters of traffic junction 1 may be compared to vehicle parameters such as vehicle width, vehicle height, vehicle length, swing-out behavior of vehicle 8, and turning circle.

In addition, parameters of traffic junction 1 may be ascertained, based on the measured data of surroundings sensor system 16 of commercial vehicle or of vehicle 8, and in particular by evaluating the measured data by control unit 14, and used for assessing the trafficability. For assessing the trafficability, for example the particular roadway boundaries and centers 12 may be detected and the particular radii and the available driving surfaces may be derived. A comparison of the parameters of traffic junction 1 to the vehicle parameters may thus be used for a check as to whether this surface is sufficiently dimensioned for vehicle 8 to travel on roadway 10.

Traveling through a center 12 of traffic junction 1 via an alternative trajectory 26 is checked in a further step 29 when a normal negotiating of traffic junction 1 is not possible. For example, it may be checked whether it is possible to pass through the center 12 of traffic circle 4. For this purpose, an upcoming center 12 of traffic circle 4 may be classified according to passability and trafficability with the aid of surroundings sensor system 16.

For example, it may be ruled out that center 12 is not planted with flowers or provided with structures. It is ascertained whether the area in center 12 includes a flat surface without potholes, and whether this surface is made of a negotiable material. If area 12 includes a flat surface made of a negotiable material, center 12 is classified as passable.

This information could also be obtained from a map, but may preferably be checked with the described steps before vehicle 8 travels through.

Detection and/or prediction of surrounding traffic and subsequent trajectory planning 31 of alternative trajectory 26 is carried out in a further step 30, taking the detected and/or predicted surrounding traffic into account. Alternative trajectory 26 may preferably be created based on the information of surroundings sensor system 16.

In addition, an entry decision may be made, and a control 32 of vehicle 8 along computed alternative trajectory 26 may be carried out. For this purpose, control unit 14 may generate control commands that prompt a vehicle control system for negotiating alternative trajectory 26.

Surroundings sensor system 16 may also be used for detecting and predicting the surrounding traffic in order to ensure that while traveling through, no road user is hindered contrary to regulatory requirements. In particular, enabling travel through traffic junction 1 may be triggered, and alternative trajectory 26 may be adjusted when there is no hindrance or endangerment of nearby road users.

After traveling through traffic junction 1 or traffic circle 4, vehicle 8 may continue its travel.

What is claimed is:

1. A method for guidance of a commercial vehicle at a traffic junction including a traffic circle, wherein the traffic circle is defined in a digital map as a combination of a center non-roadway area and a roadway, the non-roadway area being encircled by the roadway, the roadway including one or more lanes and having outlets to respective branching roadways of the traffic junction, and an interior boundary of the roadway forming an exterior boundary of the center non-roadway area, the method comprising the following steps:

determining, by a control unit and prior to the commercial vehicle traveling into the traffic junction, that the commercial vehicle is unable to travel within a width of the roadway around the center non-roadway area throughout an entirety of travel by the commercial vehicle from entry into the traffic junction until exit from the traffic junction via an intended one of the outlets;

detecting and/or predicting, by the control unit, surrounding traffic in the traffic junction;

in response to the determination of the inability:
performing, by the control unit, a check by which the control unit ascertains that the center non-roadway area is at least partially physically traversable by the commercial vehicle;

based on the ascertainment and on the detected and/or predicted surrounding traffic, generating, by the control unit, a target trajectory that at least partially traverses at least part of the center non-roadway area of the traffic circle; and performing, by the control unit, an operation of the commercial vehicle by which vehicle travels along the trajectory by which at least part of the commercial vehicle crosses into the center non-roadway area.

2. The method as recited in claim 1, wherein the determining performed by the control unit includes comparing vehicle parameters of the commercial vehicle to data of the digital map.

3. The method as recited in claim 1, further comprising obtaining measured data of surroundings of the commercial vehicle, wherein the determining performed by the control unit is performed using the obtained measured data.

4. The method as recited in claim 1, further comprising the following step:
detecting elevations and/or depressions in the center non-roadway area, wherein the determination is based on the detected elevations and/or depressions.

5. The method as recited in claim 1, further comprising:
receiving information concerning the traffic junction via a communication link.

6. The method as recited in claim 1, further comprising, when determining that another traffic circle is non-negotiable by the commercial vehicle, contacting, by the control unit, a teleoperator that is remote from the commercial vehicle and providing, via the contacting, remote control of the commercial vehicle to the teleoperator.

7. The method as recited in claim 1, wherein the generation of target trajectory occurs during route planning for the commercial vehicle prior to the commercial vehicle being at the traffic junction.

8. A control unit for guidance of a commercial vehicle at a traffic junction including a traffic circle, wherein the traffic circle is defined in a digital map as a combination of a center non-roadway area and a roadway, the non-roadway area being encircled by the roadway, the roadway including one or more lanes and having outlets to respective branching roadways of the traffic junction, and an interior boundary of the roadway forming an exterior boundary of the center non-roadway area, the control unit comprising a processor, wherein the processor is configured to:

determine, prior to the commercial vehicle traveling into the traffic junction, that the commercial vehicle is unable to travel within a width of the roadway around the center non-roadway area throughout an entirety of travel by the commercial vehicle from entry into the traffic junction until exit from the traffic junction via an intended one of the outlets;

detect and/or predict surrounding traffic in the traffic junction;

in response to the determination of the inability:
perform a check by which the processor ascertains that the center non-roadway area is at least partially physically traversable by the commercial vehicle;

based on the ascertainment and on the detected and/or predicted surrounding traffic, generate a target trajectory that at least partially traverses at least part of the center non-roadway area of the traffic circle; and perform an operation of the commercial vehicle by which vehicle travels along the trajectory by which at least part of the commercial vehicle crosses into the center non-roadway area.

9. A non-transitory machine-readable memory medium on which is stored a computer program that is executable by a computer and that, when executed by the computer, causes the computer to perform a method for guidance of a commercial vehicle at a traffic junction including a traffic circle, wherein the traffic circle is defined in a digital map as a combination of a center non-roadway area and a roadway, the non-roadway area being encircled by the roadway, the roadway including one or more lanes and having outlets to respective branching roadways of the traffic junction, and an interior boundary of the roadway forming an exterior boundary of the center non-roadway area, the method comprising:

determining, prior to the commercial vehicle traveling into the traffic junction, that the commercial vehicle is unable to travel within a width of the roadway around the center non-roadway area throughout an entirety of travel by the commercial vehicle from entry into the traffic junction until exit from the traffic junction via an intended one of the outlets;

detecting and/or predicting surrounding traffic in the traffic junction;

in response to the determination of the inability:
performing a check by which the control unit ascertains that the center non-roadway area is at least partially physically traversable by the commercial vehicle;

based on the ascertainment and on the detected and/or predicted surrounding traffic, generating a target trajectory that at least partially traverses at least part of the center non-roadway area of the traffic circle; and performing an operation of the commercial vehicle by which vehicle travels along the trajectory by which at least part of the commercial vehicle crosses into the center non-roadway area.

* * * * *